Feb. 19, 1963   P. F. MARX   3,078,332
ELECTRO-CONDUCTIVE PIPE COUPLING
Filed Oct. 2, 1959
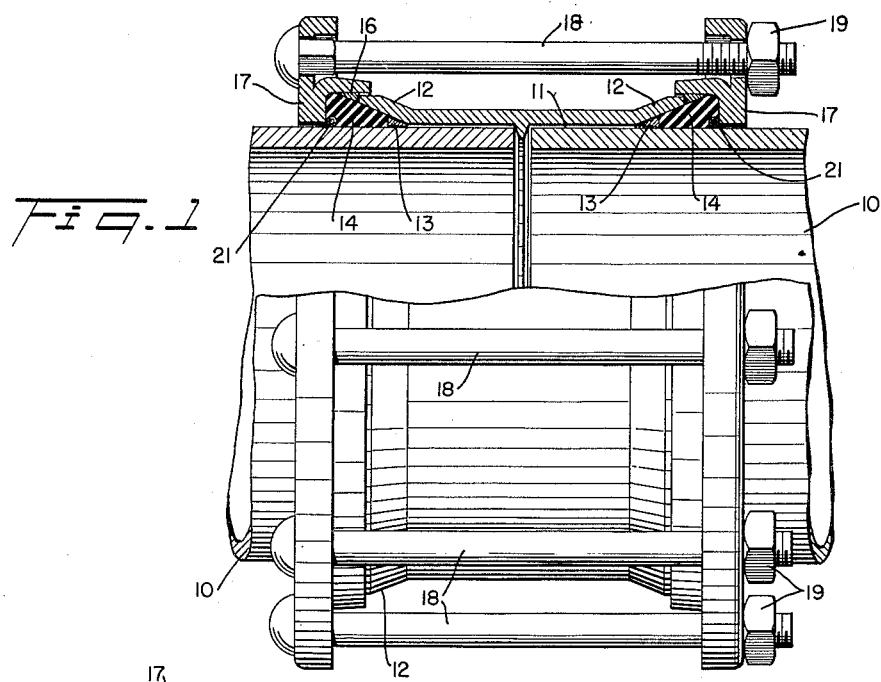
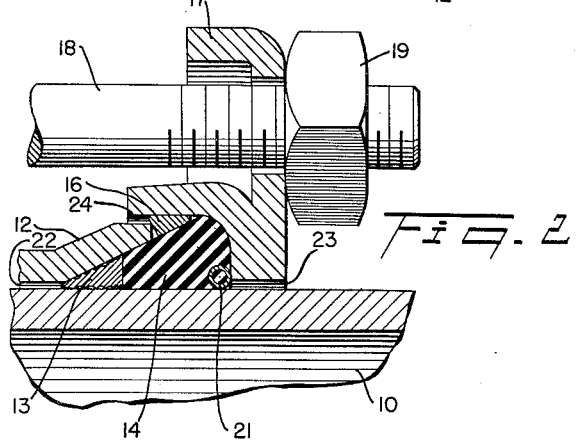
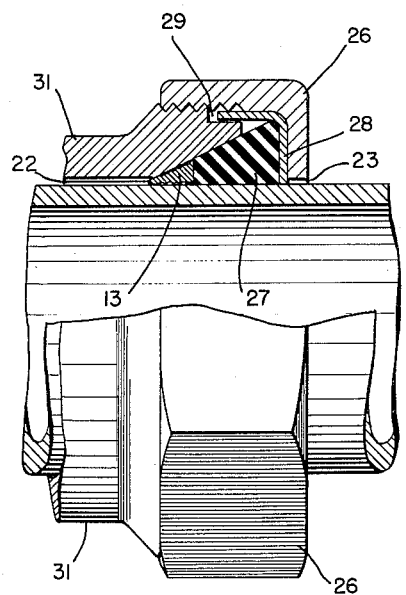
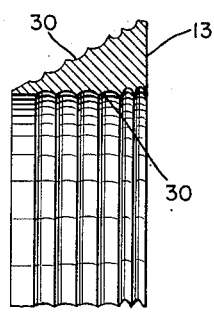

United States Patent Office 3,078,332
Patented Feb. 19, 1963

3,078,332
ELECTRO-CONDUCTIVE PIPE COUPLING
Paul F. Marx, McKean, Pa., assignor to Dresser Industries,
Inc., Dallas, Tex., a corporation of Delaware
Filed Oct. 2, 1959, Ser. No. 844,068
5 Claims. (Cl. 174—91)

The invention relates generally to couplings for pipes, tubing and the like, all hereinafter referred to generically as "pipes," and more particularly to electro-conductive couplings for pipes.

In any cathodically protected pipe line, it is necessary for the entire pipe line to be electrically conductive. Thus, any joints between adjacent sections of pipe must not only seal against leakage but must also provide a low resistance path between the two pipe sections. Gaskets effective for sealing the coupling of adjacent pipe sections against leakage are usually comprised of material having high electrical resistance values and poor conductivity.

It is an object of the invention to provide an improved electro-conductive coupling without reducing the effectiveness of the leakage seal.

In accordance with the invention there is provided a compression type coupling having a middle ring, followers located at either end of the middle ring, inwardly converging tapered rubber gaskets disposed between the followers and the middle rings, metal conductor rings disposed between the middle ring and the pipes to be coupled and which are forced into intimate contact between the members by the gaskets, and metal retainer rings having a trapezium cross-section disposed between the middle rings, the gaskets and the followers, a flat surface side being provided for contact with each of these parts and a fourth side normal the axis of the pipe. Threaded bolts connect the followers and associated nuts are tightened to compress the elements of the coupling.

It is an object of the invention to provide an improved electro-conductive coupling with no reduction in the effectiveness of the leakage seal.

Other objects and features of the invention will be apparent from the following detailed description of the illustrative embodiments of the coupling of the invention and from the drawings wherein:

FIG. 1 is a side elevational view partly in section of a pipe coupling embodying the invention;

FIG. 2 is an enlarged sectional view of a portion of the coupling illustrated in FIG. 1;

FIG. 3 is an enlarged elevational view in partial section of another embodiment of the invention; and FIG. 4 is an enlarged elevational view in partial section of the conductor ring and the adjacent pipe.

Referring to FIG. 1 plain end pipe sections 10 are connected by a coupling similar in many respects to the well known "Dresser" coupling but including additional elements which, in combination, comprise the invention. The coupling comprises a middle ring 11 having flared ends 12 to form packing recesses with the coupled pipes. Transversely split serrated metal rings 13 are inserted into the toe or bottom of each packing recess. Annular gasket rings 14 shaped to fit into the recesses are inserted in each of the recesses. Annular metal retaining rings 16 are placed around the gaskets adjoining the ends of the middle ring 12. Clamping rings 17 having horizontal flanges for encompassing the exterior ends of the metal retaining rings 16 and ends of the middle ring are fitted over the pipe sections and are connected by through-bolts 18. Nuts 19 on one end of the through-bolts compress the elements of the coupling at each end of the middle ring to form a leak-proof electrically conductive coupling.

The detailed construction of the coupling is shown more clearly in the enlarged view of FIG. 2. The metal conductor ring 13 is triangular wedge-shaped in cross section and has annular serrations on its two longest sides comprising inner and outer surfaces. The ring is formed of resilient yet relatively hard conductive material such as steel or bronze and is transversely split so as to be expansible and contractible. This ring comprises the "toe" of the packing. The gasket 14 is composed of elastomeric material and has a cross sectional shape of a truncated round base wedge. An annular metal helix 21 is embedded in the "heel" of the gasket. The middle ring 12 and the clamping ring 17 fit loosely around the pipe sections 10, the loose fit being necessary to accommodate variations in the external diameter of commercial pipe sections. When the through-bolts 18 are tightened by means of the nuts 19, pressure is applied to the gasket 14 forcing it into fluidtight sealing engagement with the pipe 10 and the middle ring 12. The tightening of the through-bolts also forces the conductor ring 13 axially inwardly so as to wedge in the angle between the pipe wall and the flared end portion of the middle ring thereby separating the pipe and middle to leave a space 22. Also the compression of gasket 14 separates the clamping ring 17 from the pipe 10 leaving a space 23, and separates the flaired end of the middle ring 12 and the clamping ring 17 to leave a space 24. The serrations on the split conductor ring 13 bite into the surfaces of the pipe 10 and the middle ring 12 respectively to form a low resistance electrical connection. The retainer rings 16 are preferably of the same metal as the conductor rings 13 and are of trapezium shape having surfaces engaging the outer gasket surface, the end of the middle ring and the annular flange of the clamping rings and having a fourth side approximately normal to the axis of the pipe section. The rings 16 avoid extrusion of gasket material through the annular space 24 between the middle ring and the clamping ring and also provide electrical contact between the middle ring and the clamping ring. It is apparent from FIG. 1 that without the metal conductor rings and the retainer rings there would be no low resistance metallic path through the coupling because of the spaces 22, 23 and 24.

FIG. 3 illustrates another embodiment of the invention in which a sleeve type coupling with a locking ring 26 is illustrated. In this embodiment the serrated metal conductor ring forms the toe of the recess packing and a rubbery composition gasket 27 composes the rest of the packing. A gasket retainer ring 28 which takes the form of a substantially cup-shaped annular member is dimensioned to be received into the annular space between the locking ring 26, the gasket 27, and the cylindrical surface 29 of the sleeve 31. Thus, an all metal low resistance path through the coupling comprising the conductor ring 13 and the gasket retainer ring 28 join the pipe section 10, the middle ring 31 and the locking ring 26.

FIG. 4 illustrates in greater detail the annular sharp serrations 30 that extend around the inner and outer peripheries for the full width. The serrations are continuous on the two long sides comprising the wedge-shaped cross-section. It is these serrations which as these rings are seated scrape the adjacent metal parts leaving a clean surface for the good electrical contact.

While the invention has been illustrated and described with reference to preferred embodiments thereof, it will be obvious that the various changes and modifications in addition to those above mentioned will be made without parting from the scope of the invention as defined in the appended claims. It will be further understood that insofar as they are not mutually incompatible, various features and details in constructions of the several embodiments shown and described are interchangeable with one another. It is intended therefore, that all matter contained in the foregoing description and in the drawings shall be interpreted as illustrative only and not as limitative of the invention.

What I claim and desire to secure by letters patent is:

1. An electro-conductive pipe cupling for smooth, plain-end electrically conductive pipes comprising an electrically conductive middle ring having threaded ends defining an internal annular recess that extends radially and axially outward; a transversely split metal conductor ring, wedge-shaped in cross-section with three sides and having a plurality of annular serrations extending along the full length of two of said three sides, said conductor ring being inserted in the toe of said recess intermediate said pipe and said middle ring with the serrated sides in respective contact therewith for providing a low electrical resistance path between said pipe and ring; a gasket member received in said recess exterior of said conductor ring for providing a fluid seal, annular locking nuts tapped to engage the respective threaded ends of said middle ring and movable axially inwardly in relation to said middle ring to compress the respective gasket members and seat said conductor rings in the toes of said annular recesses, the serrations of said rings abraiding the contacted surface to make good electrical contacts and provide a low electrical resistance path between said pipes and said middle ring.

2. An electrically conductive pipe coupling comprising in combination a metal middle ring having at least two end portions and a pipe aperture in each said end portions to respectively receive an end portion of metal pipe, and an open ended annular gasket recess in each said middle ring end portion surrounding said pipe end portions received in said apertures, each said gasket recess having a metallic annular wall that is inclined radially and axially outwardly at an acute angle to the wall of its received pipe end portion, a contractible metal ring disposed in the axially innermost portion of each said gasket recess, each said ring having an inner surface engaging its received pipe end portion, an inclined outer peripheral surface engaging said annular wall of a said gasket recess, and an outer end face, said surfaces in contact with said metal pipe and wall having a plurality of sharp annular serrations on the full extent of said surfaces for biting into the contacted metal surfaces to make good electrical contact with said surfaces and to offer a low metallic resistance path between each said metal pipe end portion and said middle ring, an annular gasket formed of elastomeric material disposed axially outward of each said metal ring extending into each said gasket recess and respectively engaging the outer end faces of the respective rings, and respective metal follower means movable axially inwardly in relation to said middle ring to enclose and compress said gaskets and compress said contractible serrated metal rings into the respective recesses between the pipe walls and said inclined annular metallic walls of said gasket recesses, thereby providing a highly conductive metal to metal electrical path between said coupled pipes through said coupling.

3. An electrically conductive pipe coupling as described in claim 2 characterized in that each said metal follower means comprises a clamping ring having a radially outer portion for use in axially moving said clamping ring, and a radially inner portion for closing the open end of said gasket recess and compressing said gasket and contractible serrated ring in said recess.

4. An electrically conductive pipe coupling as described in claim 2 characterized in that each said metal follower means comprises a locking ring having an axially extending portion with interior screw threads for threadably engaging said metal middle ring and a radially extending portion for closing the open end of said gasket recess, a cup-shaped metallic gasket retainer ring having a portion intermediate said gasket and said locking ring and a portion intermediate said middle ring and locking ring for ease in rotating said locking ring when threadably engaging said middle ring.

5. An electrically highly conductive pipe coupling for coupling electrically conductive pipes comprising in combination, an electrically conductive middle ring for receiving the axially inserted end portions of coupled pipe sections, said middle ring having a center axis and outwardly flaring ends defining annular recesses with said inserted end portions, each said recess having an approximately triangular cross section the toe end directed axially inward, electrically conductive rings each having a triangular cross section and adapted to fit into each said annular recess near said toe end and to circumferential reduction when axially compressed, and each said conductive ring having an inner circumferential surface for engaging a pipe section, an outer peripheral surface forming an angle with said inner surface for engaging a pipe section, an outer peripheral surface forming an angle with said inner surface for engaging outwardly flaring end of the middle ring, and an outer face opposite said angle formed between said surfaces, said inner and outer surfaces defining a plurality of serrations for biting through any scale and dirt and into said pipe to make a good electric contact between said conductive ring and pipe, annular gaskets formed of elastomeric material and disposed axially outward of each said conductive ring and each said gasket shaped to fit into a said annular recess to engage the end face of an associated conductive ring, follower means movable axially inward to contact and compress said gaskets to seal said recesses and to resiliently engage the end faces of said conductive rings to compress said conductive rings into the toe end of said recesses and into continuous abrasive engagement with said pipe sections and said middle ring ends and to hold said conductive rings firmly in such engagement under variable conditions of vibration, and temperature to form with said pipe sections and middle ring an electrically highly conductive path between said pipe sections through said pipe coupling.

References Cited in the file of this patent

UNITED STATES PATENTS

| 1,712,108 | Goeller | May 7, 1929 |
| 2,021,745 | Pfefferle et al. | Nov. 19, 1935 |
| 2,202,492 | Jacocks | May 28, 1940 |
| 2,347,897 | Febrey | May 2, 1944 |
| 2,376,017 | Smallpeice | May 15, 1945 |
| 2,460,032 | Risley | Jan. 25, 1949 |
| 2,507,261 | Mercier | May 9, 1950 |
| 2,779,610 | Risley | Jan. 29, 1957 |
| 2,832,615 | Summers | Apr. 29, 1958 |

FOREIGN PATENTS

| 208,425 | Italy | Apr. 16, 1940 |